US009446978B2

(12) United States Patent
Spitler et al.

(10) Patent No.: US 9,446,978 B2
(45) Date of Patent: Sep. 20, 2016

(54) SYSTEM AND METHOD FOR CONTINUOUS STRAND FIBERGLASS MEDIA PROCESSING

(71) Applicants: Charles Douglas Spitler, Southlake, TX (US); Rodney Ray Wilkins, Granville, OH (US)

(72) Inventors: Charles Douglas Spitler, Southlake, TX (US); Rodney Ray Wilkins, Granville, OH (US)

(*) Notice: Subject to any disclaimer, the term of this patent is extended or adjusted under 35 U.S.C. 154(b) by 203 days.

(21) Appl. No.: 14/181,426

(22) Filed: Feb. 14, 2014

(65) Prior Publication Data

US 2015/0232373 A1    Aug. 20, 2015

(51) Int. Cl.

| | |
|---|---|
| *B29C 35/04* | (2006.01) |
| *B29C 53/66* | (2006.01) |
| *C03B 37/07* | (2006.01) |
| *C03B 37/083* | (2006.01) |
| *D04H 3/004* | (2012.01) |
| *D04H 3/02* | (2006.01) |
| *D04H 3/12* | (2006.01) |
| *C03B 37/03* | (2006.01) |
| *B29C 53/80* | (2006.01) |
| *C03B 37/02* | (2006.01) |
| *C03B 3/00* | (2006.01) |
| *C03B 5/04* | (2006.01) |

(52) U.S. Cl.
CPC ............. *C03B 37/03* (2013.01); *B29C 35/045* (2013.01); *B29C 53/66* (2013.01); *B29C 53/8041* (2013.01); *C03B 3/00* (2013.01); *C03B 5/04* (2013.01); *C03B 37/02* (2013.01); *C03B 37/0203* (2013.01); *C03B 37/0209* (2013.01); *C03B 37/0213* (2013.01); *C03B 37/07* (2013.01); *C03B 37/083* (2013.01); *D04H 3/004* (2013.01); *D04H 3/02* (2013.01); *D04H 3/12* (2013.01); *Y02P 40/57* (2015.11)

(58) Field of Classification Search
CPC .......... D04H 3/004; D04H 3/02; D04H 3/07; D04H 3/073; D04H 3/08; D04H 3/12; B29C 35/007; B29C 35/02; B29C 35/0277; B29C 35/0288; B29C 35/045; B29C 67/248; B29C 67/249; B29C 35/04; B29C 53/66; B29C 53/665; B29C 53/8041; C03B 37/0203; C03B 37/0209; C03B 37/0213; C03B 37/07; C03B 37/08; C03B 37/083; C03B 37/085
See application file for complete search history.

(56) References Cited

U.S. PATENT DOCUMENTS

| | | |
|---|---|---|
| 2,081,060 A | 5/1937 | Modigliani |
| 2,460,899 A | 2/1949 | Modigliani et al. |
| 2,546,230 A | 3/1951 | Modigliani |
| 2,574,221 A * | 11/1951 | Modigliani ............. B29C 70/00 156/167 |
| 2,609,320 A | 9/1952 | Modigliani |
| 2,729,582 A | 1/1956 | Modigliani |
| 2,913,037 A | 11/1959 | Modigliani |
| 2,964,439 A | 12/1960 | Modigliani |

(Continued)

*Primary Examiner* — Michael Tolin
(74) *Attorney, Agent, or Firm* — Bakos & Kritzer

(57) ABSTRACT

There is provided a system and method for manufacturing continuous strand fiberglass of progressive density with varying skins. Glass media is melted into molten glass within a temperature controlled melter, the molten glass exits the melter through orifices of a bushing plate, which is oriented 6 degrees relative to the axis of a rotating drum. A rotating drum receives the molten glass exiting the bushing plate, and resin and water are applied. The fiberglass media is fed through rollers before it enters a curing oven.

25 Claims, 17 Drawing Sheets

(56) References Cited

U.S. PATENT DOCUMENTS

| | | | | |
|---|---|---|---|---|
| 2,997,096 A * | 8/1961 | Morrison | | B29C 35/06 |
| | | | | 156/381 |
| 3,082,615 A * | 3/1963 | Alvarez de Toledo | | C03B 37/0209 |
| | | | | 222/146.5 |
| 3,096,161 A * | 7/1963 | Morrison | | D04H 1/00 |
| | | | | 219/765 |
| 3,097,710 A * | 7/1963 | Copenhefer | | C03B 37/085 |
| | | | | 177/115 |
| 3,134,704 A | 5/1964 | Modigliani | | |
| 3,322,585 A * | 5/1967 | Weber | | B29C 70/12 |
| | | | | 156/174 |
| 3,459,613 A * | 8/1969 | Copenhefer | | D04H 3/02 |
| | | | | 156/167 |
| 3,476,635 A * | 11/1969 | Heh | | D04H 3/02 |
| | | | | 156/174 |
| 3,526,557 A * | 9/1970 | Taylor, Jr. | | B29C 70/12 |
| | | | | 156/167 |
| 3,573,016 A * | 3/1971 | Rees | | C03B 3/00 |
| | | | | 65/160 |
| 3,826,903 A * | 7/1974 | Varrasso | | B29C 70/508 |
| | | | | 65/377 |
| 4,121,918 A * | 10/1978 | Shono | | C03B 37/083 |
| | | | | 425/72.2 |
| 4,227,906 A * | 10/1980 | Rieser | | C03B 37/0213 |
| | | | | 264/210.8 |
| 4,263,007 A * | 4/1981 | Battigelli | | B29C 35/06 |
| | | | | 425/371 |
| 4,321,074 A * | 3/1982 | Glaser | | C03B 37/0213 |
| | | | | 65/513 |
| 4,363,645 A * | 12/1982 | Eisenberg | | C03B 37/08 |
| | | | | 65/478 |
| 4,566,154 A * | 1/1986 | Streeper | | B65H 23/0258 |
| | | | | 19/161.1 |
| 4,773,764 A * | 9/1988 | Colombani | | B01F 13/10 |
| | | | | 137/563 |
| 5,695,848 A * | 12/1997 | Wilkins | | D04H 3/02 |
| | | | | 428/131 |
| 2005/0006808 A1* | 1/2005 | Thomas | | B32B 5/26 |
| | | | | 264/119 |
| 2012/0271445 A1* | 10/2012 | Li | | G05D 23/1919 |
| | | | | 700/103 |

* cited by examiner

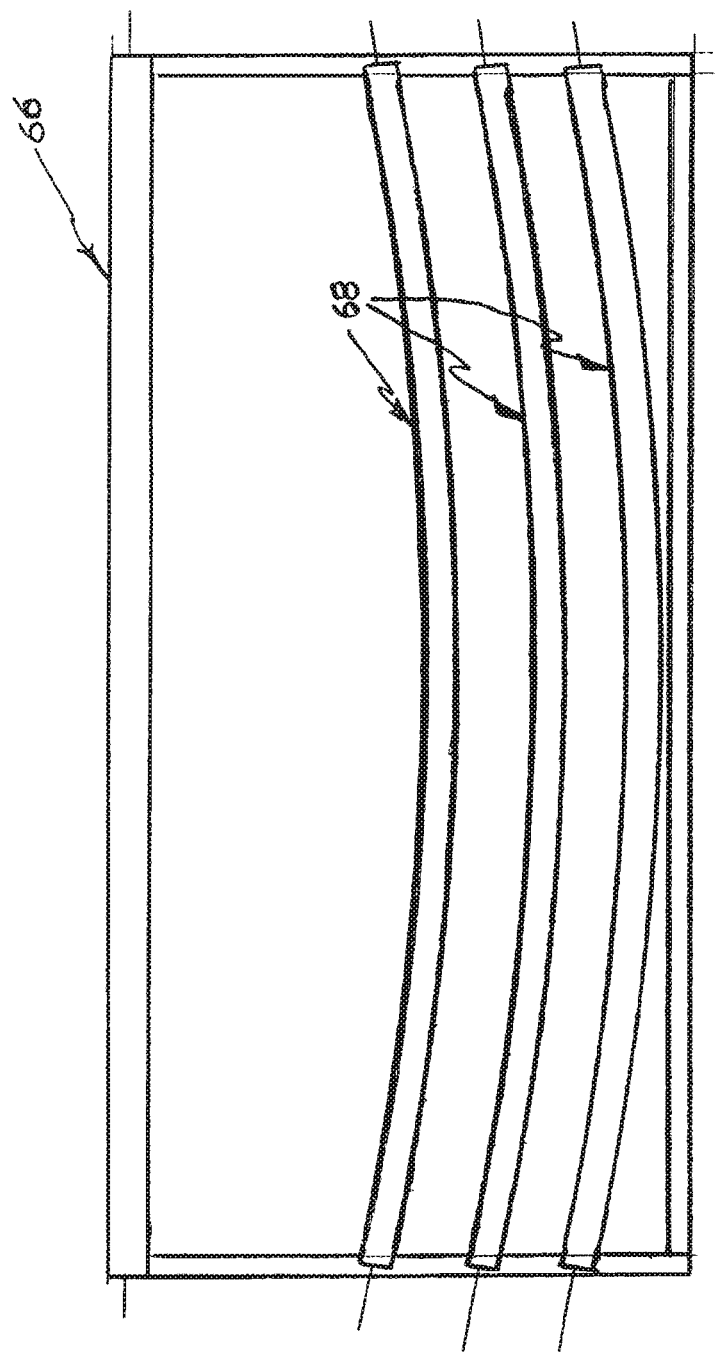

SYSTEM AND METHOD FOR CONTINUOUS STRAND FIBERGLASS MEDIA PROCESSING

This disclosure relates to a system, method and apparatus of manufacturing fiberglass and more particularly relates to an improved process of manufacturing fiberglass and an apparatus for improving the quality, efficiency and cost of manufacturing fiberglass.

BACKGROUND OF THE INVENTION

This disclosure in particular relates to an improved selection of raw materials input, involving the use of recycled cullet screened and vibrated, as well as a specially mixed and controlled resin with the addition of aqueous solutions and an improved apparatus for melting the fiberglass, sometimes referred to as the melter furnace, the plate (bushing) with perforations (orifices) for exiting the molten fiberglass from the melter, a temperature control assembly controlling temperature of the Urea Formaldehyde (UF) Resin and filament strands exiting the orifices of the bushing plate, in combination with an aqueous solution spray through a spray assembly and binder(s) through a binder spray assembly, which sprays various additives and control chemicals onto the fiberglass to adjust its properties as it winds onto a rotating drum, and the ability to spray various aqueous solutions onto the rotating drum in a specified manner covering the fiberglass mat deposited and varying configurations of roller assemblies utilizing portable devices with catch basins that control water spray, and with various chemicals and control systems (software and computers) provides for increased efficiency, quality, production capacity and in particular the creation of progressive densities of a fiberglass mat manufactured from a filament strand manufacturing process.

Subsequent improvements and variations of the Modigliani process have been made and are known in the art. Modigliani and progeny generally involve a melting furnace feeding molten glass which discharges fine glass fibers. In Modigliani and progeny, during the deposition of the fibers on the rotating drum, solutions are applied to the surface of the glass media mat. Technology for making glass fiber strands is known in the art. Such technology is described in several patents issued to Modigliani, namely, U.S. Pat. Nos. 2,546,230; 2,609,320 and 2,964,439 and several mentioned thereafter. Modigliani and progeny have done little to improve upon the efficiency of the manufacturing methods and apparatus either through new control methods or through process changes and nothing to adjust densities of fiberglass states to improve both surface and bulk characteristics of the fiberglass as deposited.

The present disclosure relates to improvements to the Modigliani patents and progeny that substantially change the initial conditions and ultimate quality of the fiberglass mat, improving upon the manufacturing process, providing for a different machine and process combination and creating the capability of providing progressive density fiberglass.

It would be advantageous to provide a system of manufacturing fiberglass that increases efficiency in production.

It would also be advantageous to provide a method of manufacturing fiberglass that utilizes a specific orientation of the bushing plate to the drum.

It would further be advantageous to decrease weight variations of the fiberglass mat by using load cells to increase the accuracy of the measurement of the weight variations.

It would further be advantageous to adjust the skin of the fiberglass media by passing the fiberglass media through a roller assembly having either straight or bowed rollers or in some embodiments both with a defined angular rotation that provide differential pressure across the mat reducing weight variations across the media and providing for more consistent water content improving the quality of the top and bottom skins (surfaces) of the fiberglass media as well as creating progressive densities substantially improving the bulk and surface characteristics of the fiberglass.

It would further be advantageous to utilize load cells to decrease weight variations of the mat and increase the accuracy of the final weight which improves product quality and increase accuracy to + or −5%.

It would also be advantageous to apply water by spraying it onto a flat surface of the fiberglass mat immediately prior to curing which results in a more consistent application of water resulting in higher quality skins and/or which in combination with the use of the bowed rollers results in the production of higher quality skins.

It would further be advantageous to apply water in combination with the binder as the binder is applied to the fiberglass on the rotating drum.

It would also be advantageous to apply water in combination with the binder for controlling the moisture content range to 36%-40% content by weight.

It would further be advantageous to control binder temperature range to 70 degrees Fahrenheit plus or minus 10% of the 70 degrees.

It would also be advantageous to control densities of the fiberglass mat in order to provide progressive densities of a fiberglass mat.

SUMMARY OF THE PRESENT DISCLOSURE

In accordance with the present disclosure, there is provided, in one aspect, a method of manufacturing continuous strand fiberglass filaments having the steps of selecting raw material inputs utilizing a variety of select methods, including controlling fines, and turbidity of the glass cullet and the temperature of the resin and aqueous solutions, selecting and controlling through a temperature control system and a bushing cooling loop assembly and a PH monitoring system a selection of urea formaldehyde resins in some applications and styrene in other applications and the conditioning of aqueous solutions and melting glass into a molten state within a temperature-controlled melting furnace, with a feed-back set point for controlling level of the molten glass with molten glass filaments instead of fibers exiting the furnace through the orifices of a bushing plate at a specific relative angle and applying the aforementioned aqueous solutions onto the filaments exiting the orifices of the bushing plate onto a rotating drum at a specified width as the melting furnace traverses the longitudinal axis of the rotating drum at a specified angle of traverse and then to a let-off table and from the let-off table, through a series of Upper and Lower Skin Control Assemblies with both bowed and straight rollers in varying configurations with catch basins and integrally mounted pumps controlling moisture and together with aqueous sprays controlling progressive density of the fiberglass and a variety of skins and to the curing oven with specified temperature zones and dual speed chain control of speed through the curing oven and onto an accumulator and wind-up machine all under control of a positive feedback quality loop control system all providing the machine, processes and devices to manufacture progressive density fiberglass and progressive density fiberglass mats.

BRIEF DESCRIPTION OF THE DRAWINGS

FIG. 17 shows a top view of bowed rollers.

DETAILED DESCRIPTION

A complete understanding of the present invention may be obtained by reference to the accompanying drawings when considered in conjunction with the following description.

Figure 1:
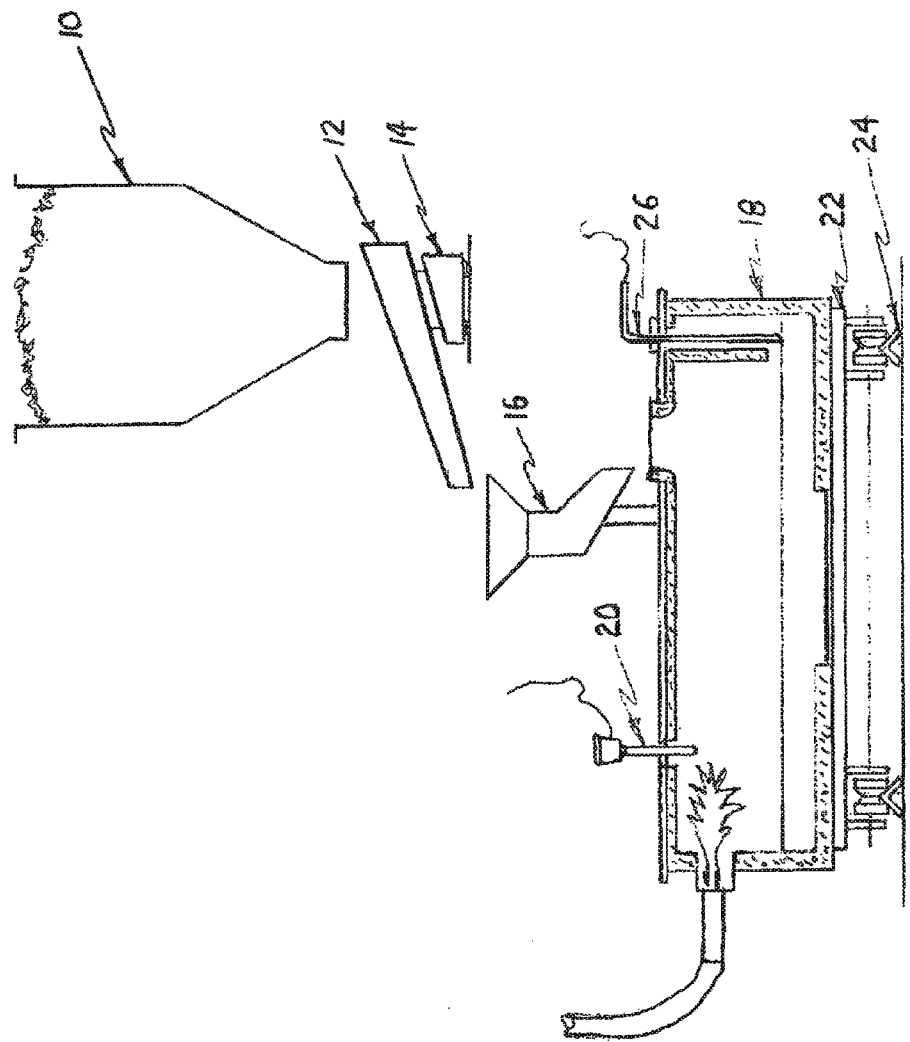
FIG. 1 shows a side cutaway view of a melting furnace with natural gas flame and a glass feeder hopper mechanism.

FIG. 1 is a side view of the glass hopper, stationary glass feeder, and vibrator, secondary chute into the traversing melter furnace, showing the traverse cart, the track and the set point controller. This figure details the relative position of the various main components of the melting furnace and its traverse mechanism, with glass hopper (10), glass feeder (12), vibrator (14), to a secondary chute (16), a melt furnace (18) a flame temperature sensor (20) and a traverse cart (22) for traversing the melter furnace with track (24) and set point controller (26) for feeding more glass in the melter furnace.

Figure 2:
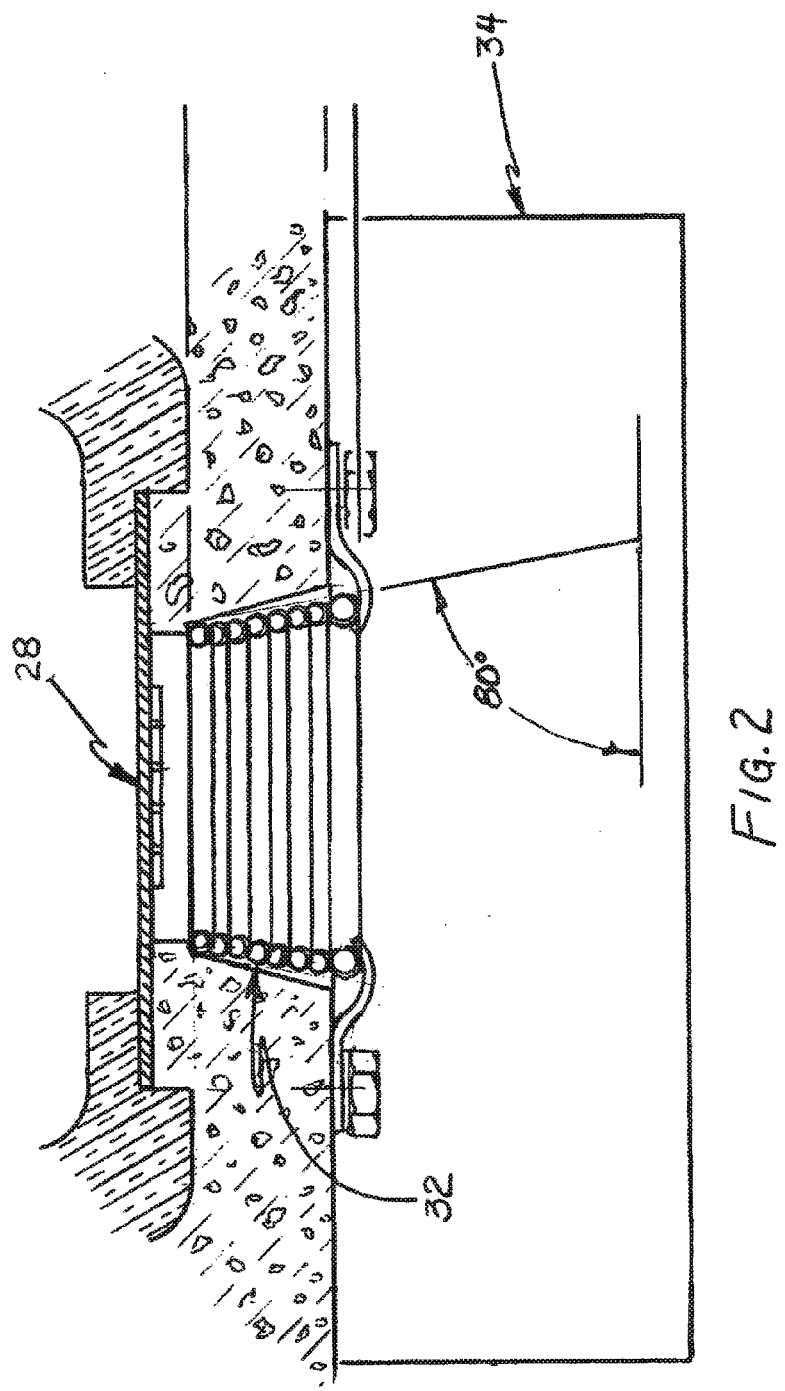
FIG. 2 shows a front cutaway view of a bushing plate and a cooling loop mounted below the glass melting furnace.

FIG. 2 is a side detail view of a bushing plate (28) demonstrating its position relative to the melter furnace (18), while portraying the dimensional position of the cooling coils (32) that transport the water used to control temperature of the fibers as they exit the bushing plate (28) through the orifices (perforations in the bushing plate through which the fibers exit). The shields (34) are used to prevent ambient and air flow from causing the filaments to collide as they exit the bushing plate orifices.

Figure 3:
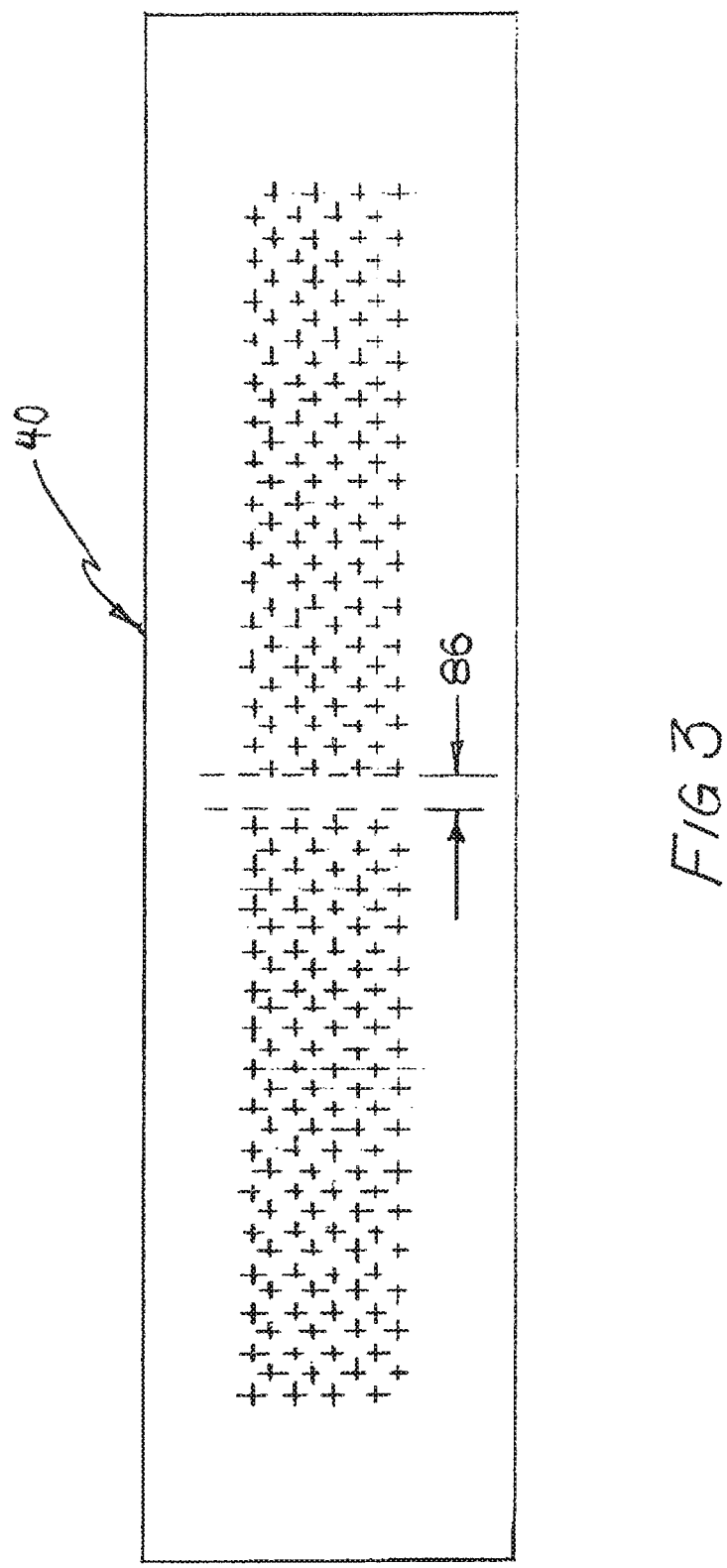
FIG. 3 shows a bottom view of a hole placement configuration on a furnace bushing plate.

FIG. 3 is a series of details for the orifices (36), the orifice tips (38) and their patterns with a 0.500 space between each set of patterns as a bottom view, and the finer detail of the orifice patterns (40).

Figure 4:
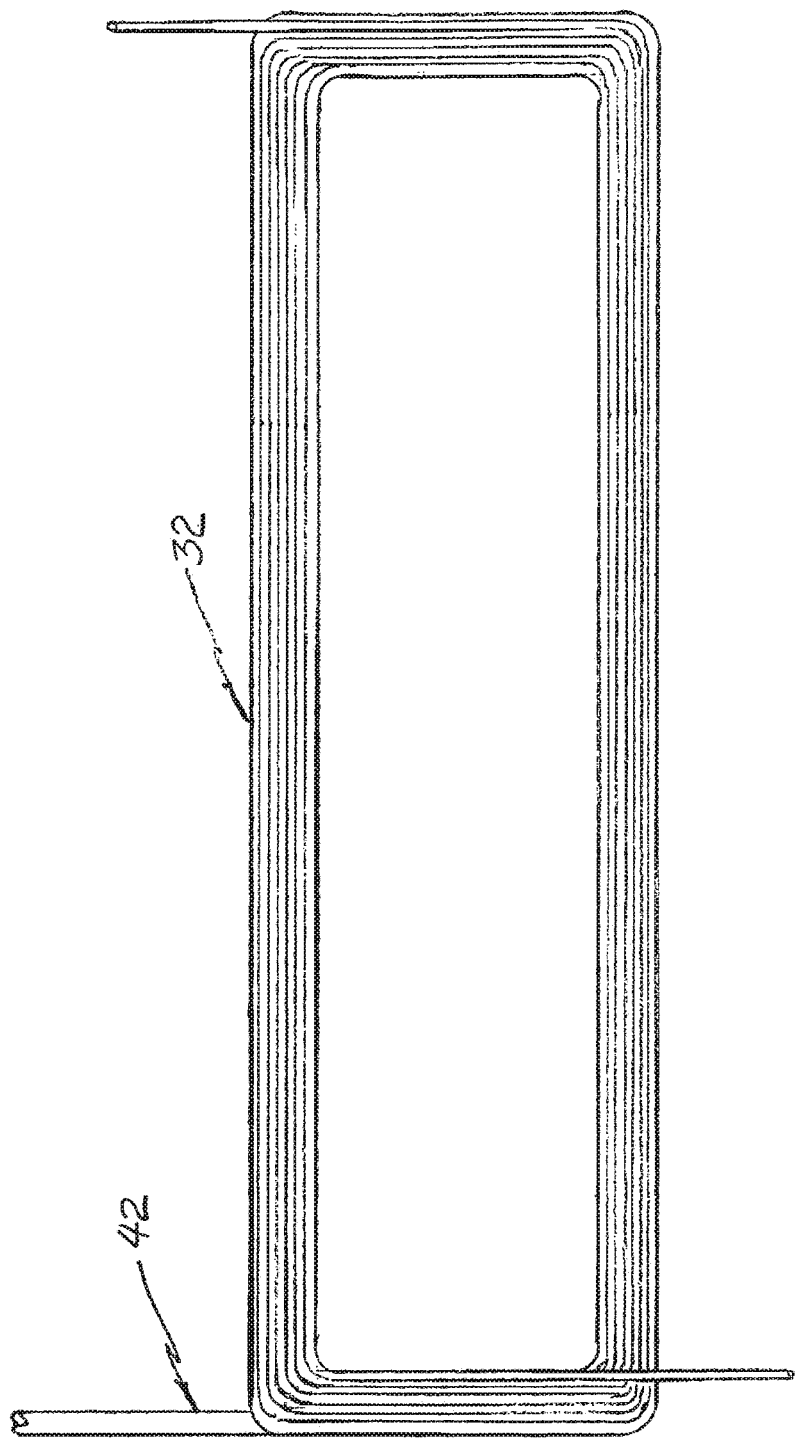
FIG. 4 shows a top view of an uninstalled cooling loop.

FIG. 4 is a drawing with detail of the bushing cooling loop assembly with a top view, a side view and an end view. The top view demonstrates the race track loop assembly that is a 3 inch interior width and 15 inches in length for the inside diameter. The side view details cooling coils (32) that are composed of a single cooper air coil that is ⅜ inch diameter for air entry to prevent clogging of the water coils with particulates combined with a series of ¼ inch copper tubing or coils wrapped adjacent to and looped back one on the other as portrayed in the side view. There is an air inlet, a water inlet and a water outlet. The end view cutaway inverted explains the function of the coils quite well. The inverted angle is 80 degrees typically with B and A shown to the side. A is a ¼ inch copper refrigeration tubing, 7 coils silver soldered. B is ⅜ inch copper tubing-perforated (perfed) with side air holes ¹⁄₃₂ inch directed at the Furnace Inconel Bushing Plate.

Figure 5:
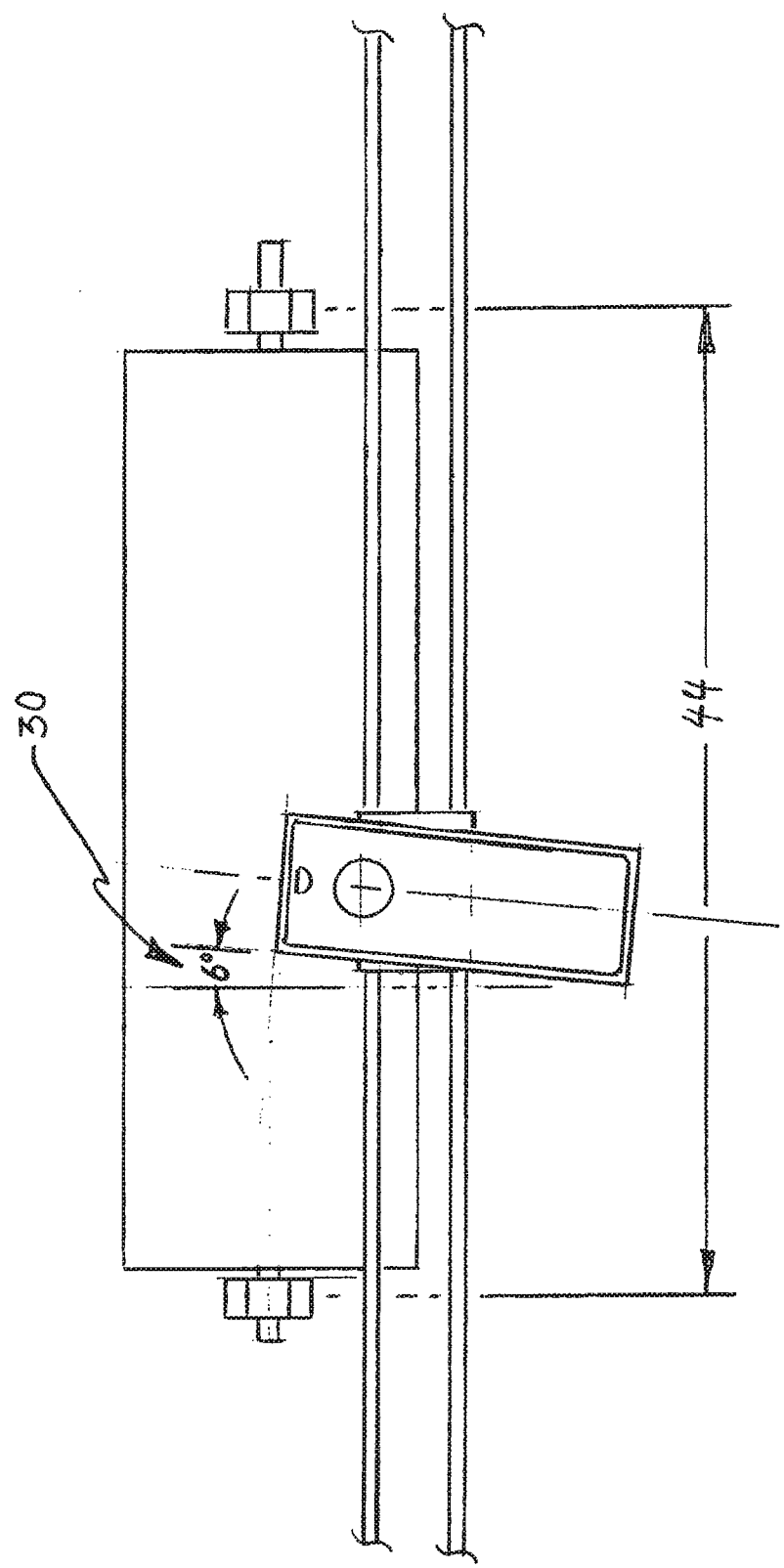
FIG. 5 shows a top view of a glass melting furnace angled above a rotating drum.

FIG. 5 demonstrates a Traverse of a Melt Furnace indicating the furnace traverse (44) along the Traverse Track (46) with a tilt of a 6 degree angle (30). An outline of the drum can be seen below the angle of traverse of the melt furnace and the approximate positioning of the traverse track over the rotating drum as well as the approximate drop location of the exiting filaments from the underside of the traverse furnace.

Figure 6:
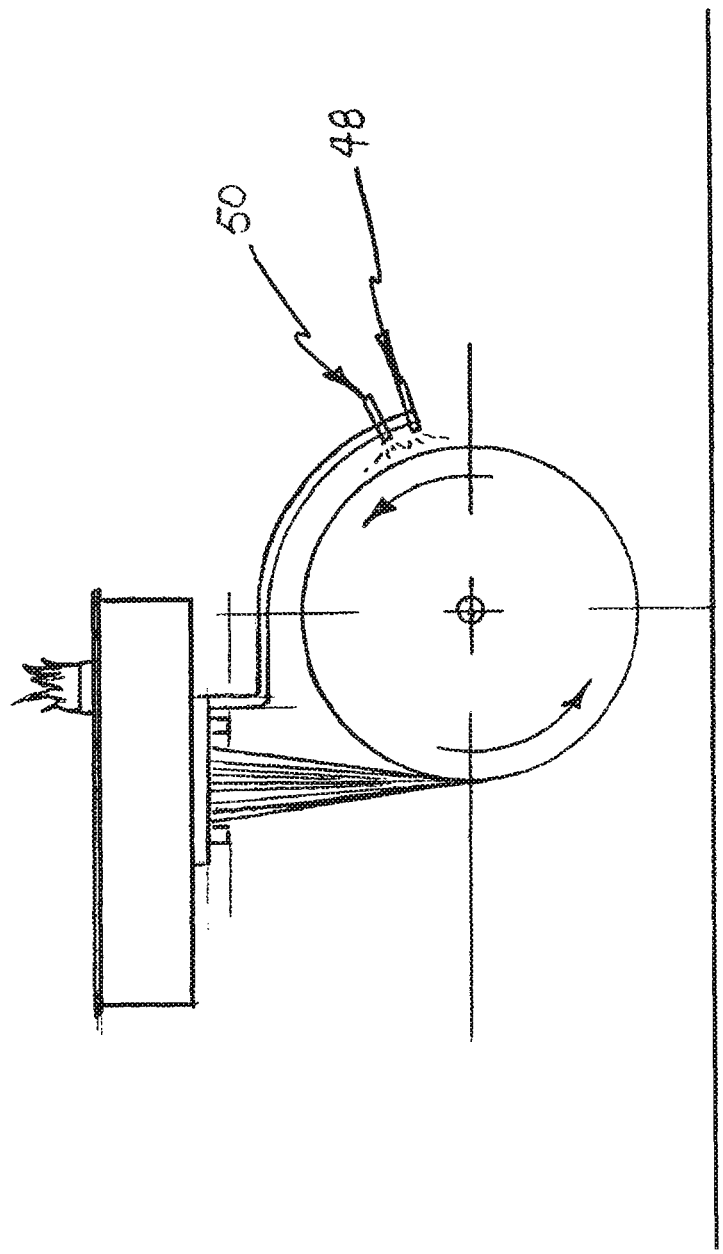
FIG. 6 shows a side cutaway view of a rotating drum beneath a furnace feeding strands of glass onto the drum.

FIG. 6 portrays a side view of the rotating drum with its elongated axis and enlarged circumference which are both essential to the high efficiency production of fiberglass in an efficient manner. FIG. 6 also shows a water spray nozzle (50) and a resin spray nozzle (48), both attached to the traverse as shown. The hollow steel drum rotates against the falling filaments as shown with the falling filaments aligned tangentially to the drum so the filaments just touch the drum at a point. FIG. 6 demonstrates the relative position of the falling fibers exiting the bushing plate and falling onto the rotating drum, as well as demonstrating the position of the binder spray head and aqueous solutions spray head relative to the traversing melter and the rotating drum including a secondary arm that sprays at least a 4 inch spray no greater than the width of the fiberglass exiting the bushing plate.

Figure 7:
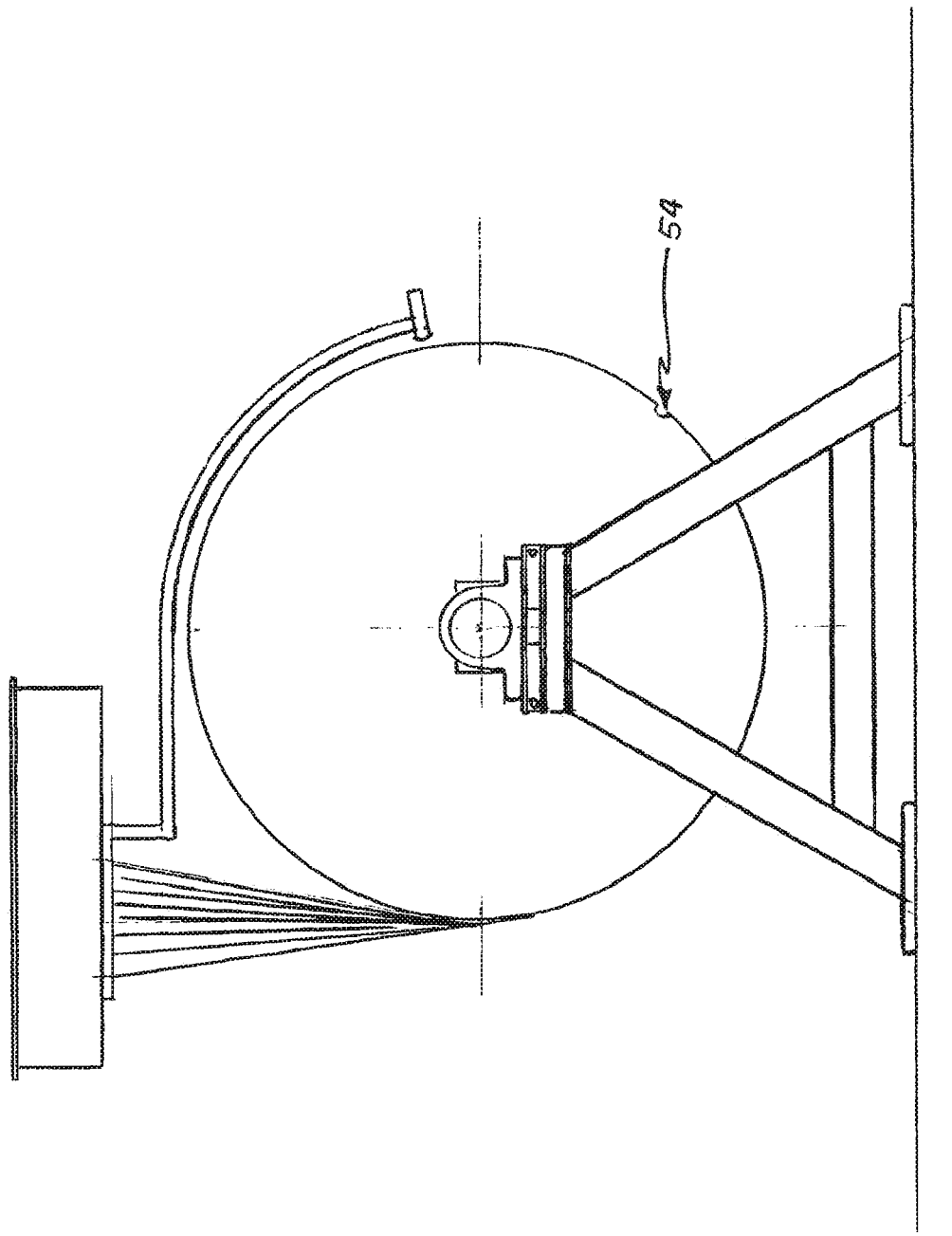
FIG. 7 shows an end view of a rotating drum illustrating a recess in the drum used to facilitate cutting completed fiberglass mat from the drum.

FIG. 7 shows a right side view of the load cell assembly (along with its strain gauge) relative to its position with respect to the hollow rotating drum. FIG. 7 portrays the load cell (52) and the rotating drum's V-notch for cutting filament mat away from the drum, based on the filaments assigned the letter A the drum assigned the letter C and the resin assigned the letter B as shown then the formula is A+B−C=Readout from the D as shown in the detail which is the distance measured in weight of the filaments+the resin−the drum=the distance of travel of the load cell as evidenced by D. Additionally the drum is V-notched (54) which allows the operator to cut longitudinally across the width of the drum to remove the mat of an appropriate length from the drum.

Figure 8:
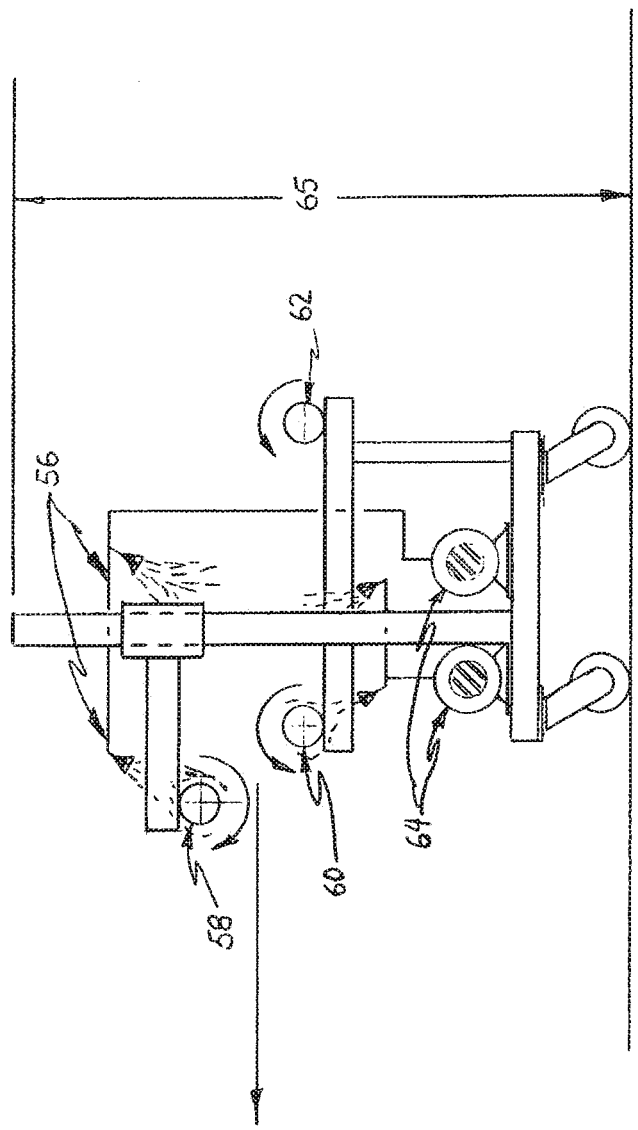
FIG. 8 shows an end view of straight rollers and their associated water spray nozzles with an arrow indicating the direction of travel of fiberglass.

FIG. 8 is a side view of a media upper and lower skin control assembly comprising a high pressure dual pumping system. Each of pumps (64) provides water sprays either on the rollers or the media. Pump A (shown on the right) provides water to water sprayers (56) on the top side of the top roller, and Pump B (shown on the left) provides water to the underside of bottom rollers (60). Each adjustable spray head assembly comprises multiple spray heads. Top rollers (58) are adjustable and separately driven with respect to bottom coasting rollers (62), controlling the skin of the fiberglass mat created and allowing for progressive density creation of fiberglass mat. Bottom rollers (60) are adjustable and separately driven from the top rollers (58).

Figure 9:
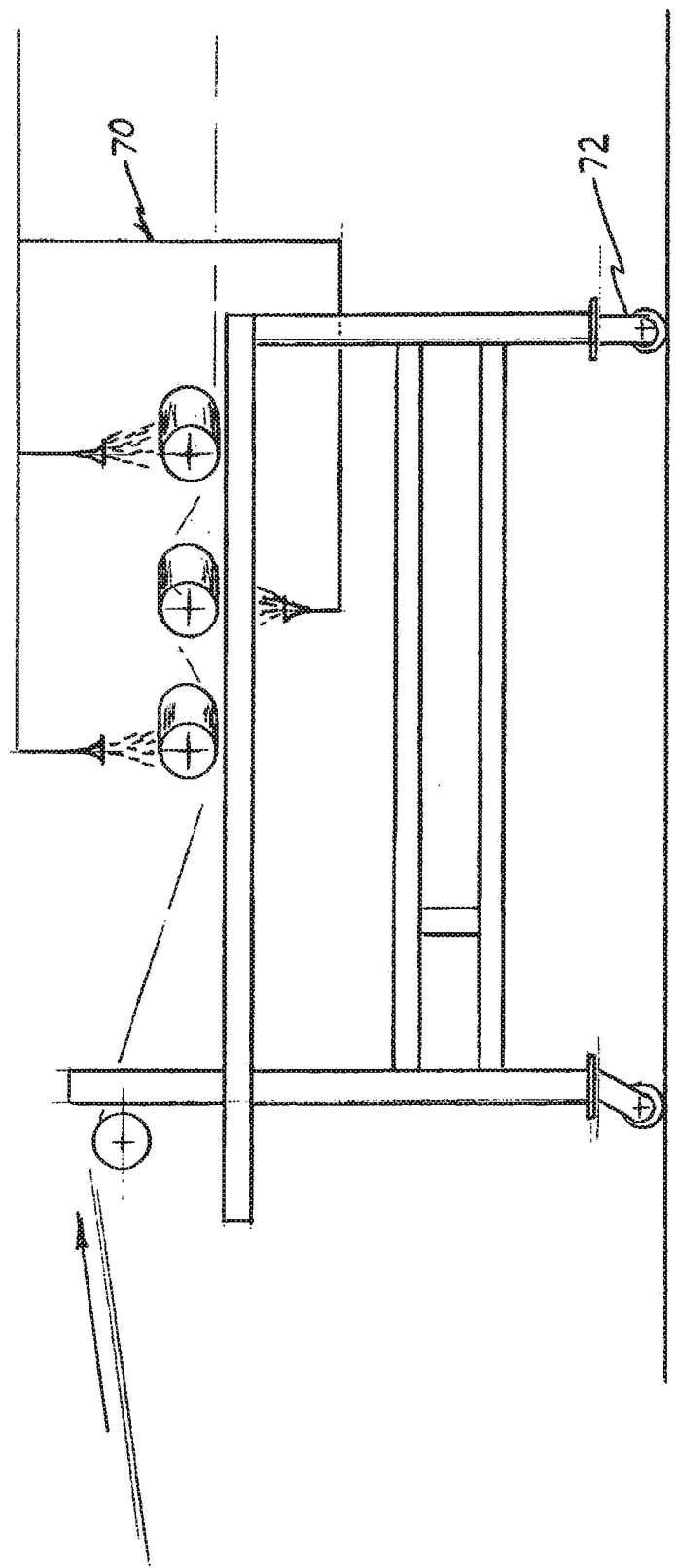
FIG. 9 shows an end view of bowed rollers and associated water sprays with an arrow indicating the direction of travel of fiberglass.

FIG. 9 portrays the side view showing the independently driven (from the oven) interconnected portable bowed roller assembly used to maintain width expansion consisting of a straight roller (66) that first engages the mat to three bowed rollers (68) that engage the mat. The fiberglass mat first slides over the first roller (straight) 66 in the direction of movement of the mat in the clockwise direction over the top of the roller and then under the second roller (first in a series of bowed rollers (68)), which is rotating in a counterclockwise direction, and then over the top of the third roller, which is bowed and rotating in a clockwise direction, and then under the fourth roller, which is bowed and rotating in a counterclockwise direction. The movement of the mat over and under the rollers provides for linear expansion of the mat. The three bowed rollers (68) are sprayed by water fog nozzle assembly (70) across the span of the bowed rollers (68) both above and below. Attached to and integrated with the portable Bowed Roller Assembly is a catch basin (72) that captures and reuses the water fogged onto the rollers from above and below. FIG. 17 is a top view of the roller assembly shown in FIG. 9.

Figure 10:
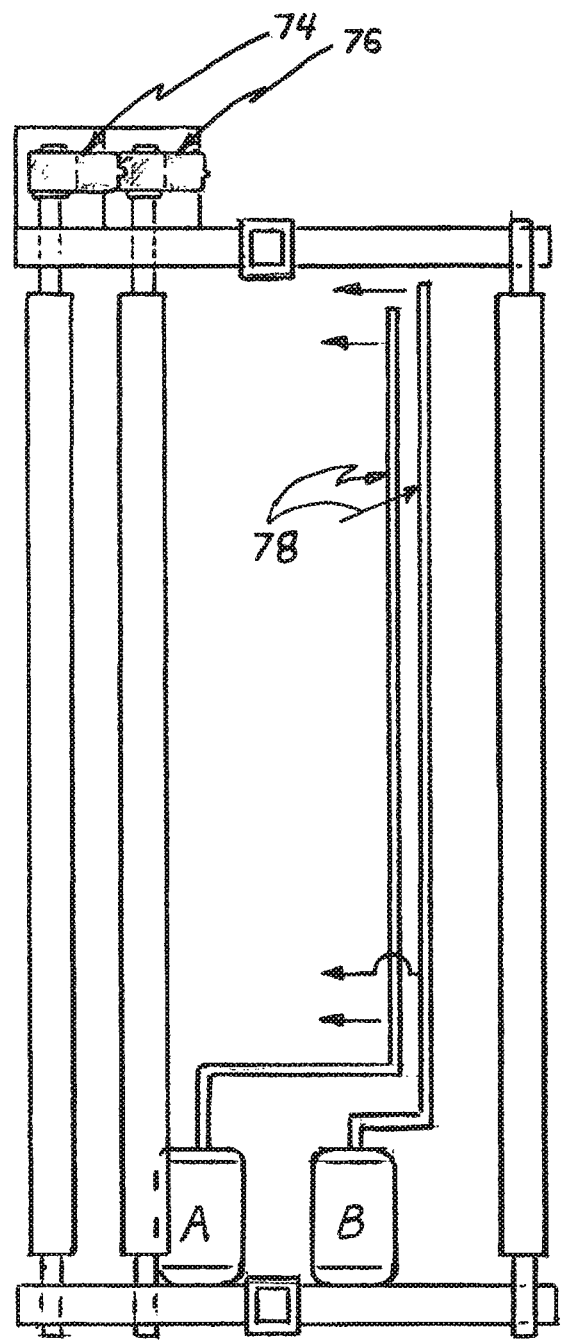
FIG. 10 shows a top view of straight rollers.

FIG. 10 is a top view of roller assembly which is comprised of a series of straight rollers (66) driven separately by a top roller drive (74) and a bottom or lower roller drive (76), multiple spray heads (78) traverse across the roller assembly to spray continuously across the entire width of the roller assembly. Aqueous solutions are sprayed from a pumping system having two pumps, an A and a B pump. The lower framing, bearings, catch basins (72) shown in prior FIG. 9 and mixers have been removed for clarity but are construed to be a part of this system.

Figure 11:
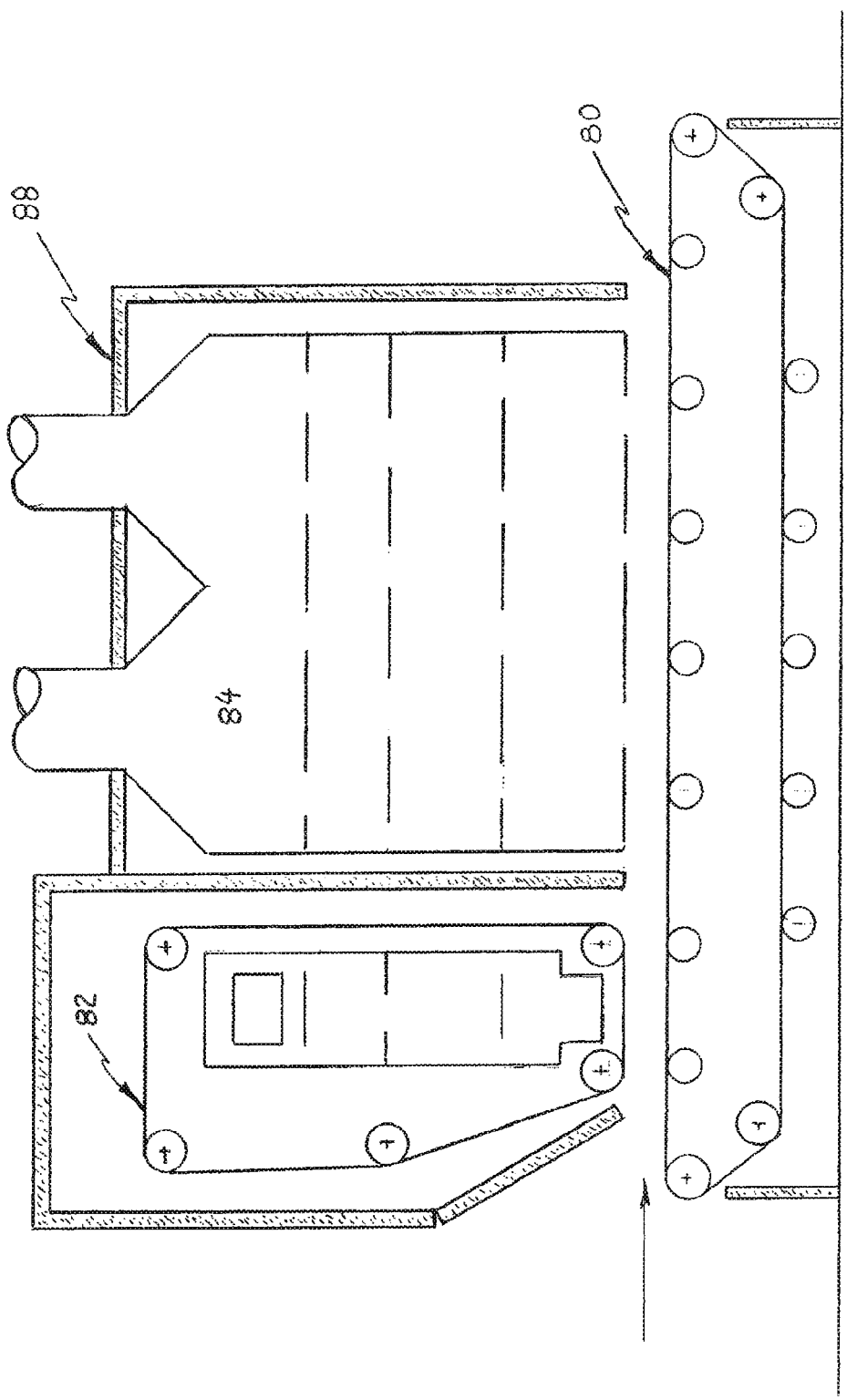
FIG. 11 shows a side cutaway view of a curing oven with an arrow indicating the direction of travel of fiberglass.

FIG. 11 is a side view cutaway of the curing oven (88) and the conveyor assembly with controller and temperature zones (84) of the oven. The mat is fed into the curing oven through a conveyor system with an upper chain conveyor (82) and lower chain conveyor (80). The upper conveyor moves at a different speed relative to the lower chain conveyor (80) to keep the mat from bunching and prevent stretching of the mat. The process parameters are controlled by a controller with a computer, software, temperature sensors and individually heated zones both above and below the conveyor.

Figure 12:
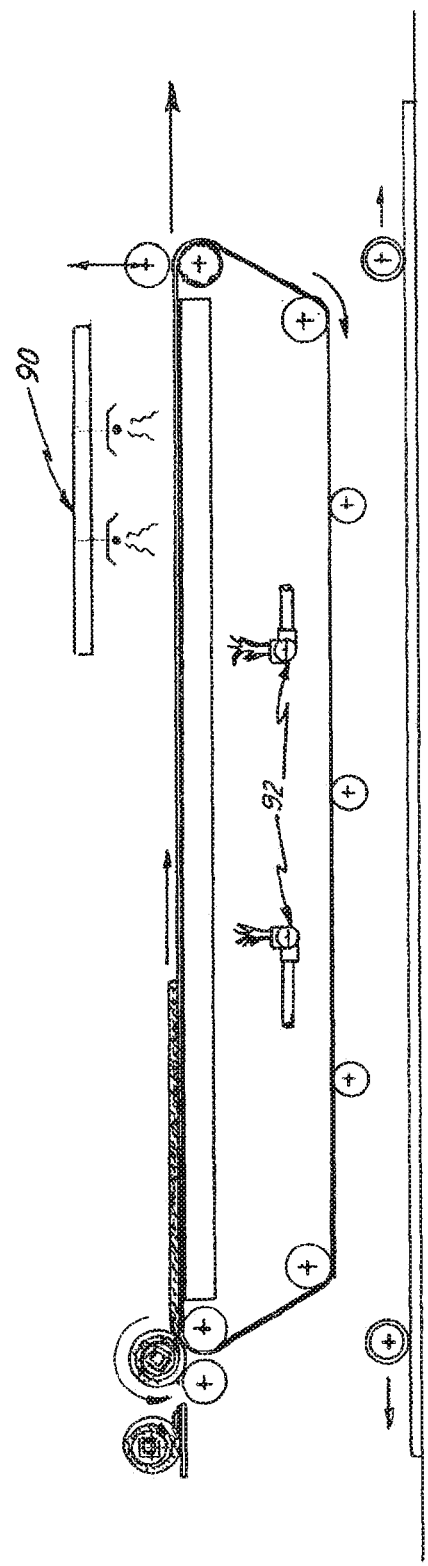
FIG. 12 shows a side cutaway view of let-off table showing gas burners below travel of fiberglass and radiant heaters above fiberglass travel with arrow indicating direction of travel of fiberglass.

FIG. 12 is a side cutaway view of let-off table showing gas burners (92) below travel of fiberglass and radiant heaters (90) above fiberglass travel with arrow indicating direction of travel of fiberglass.

Figure 13:
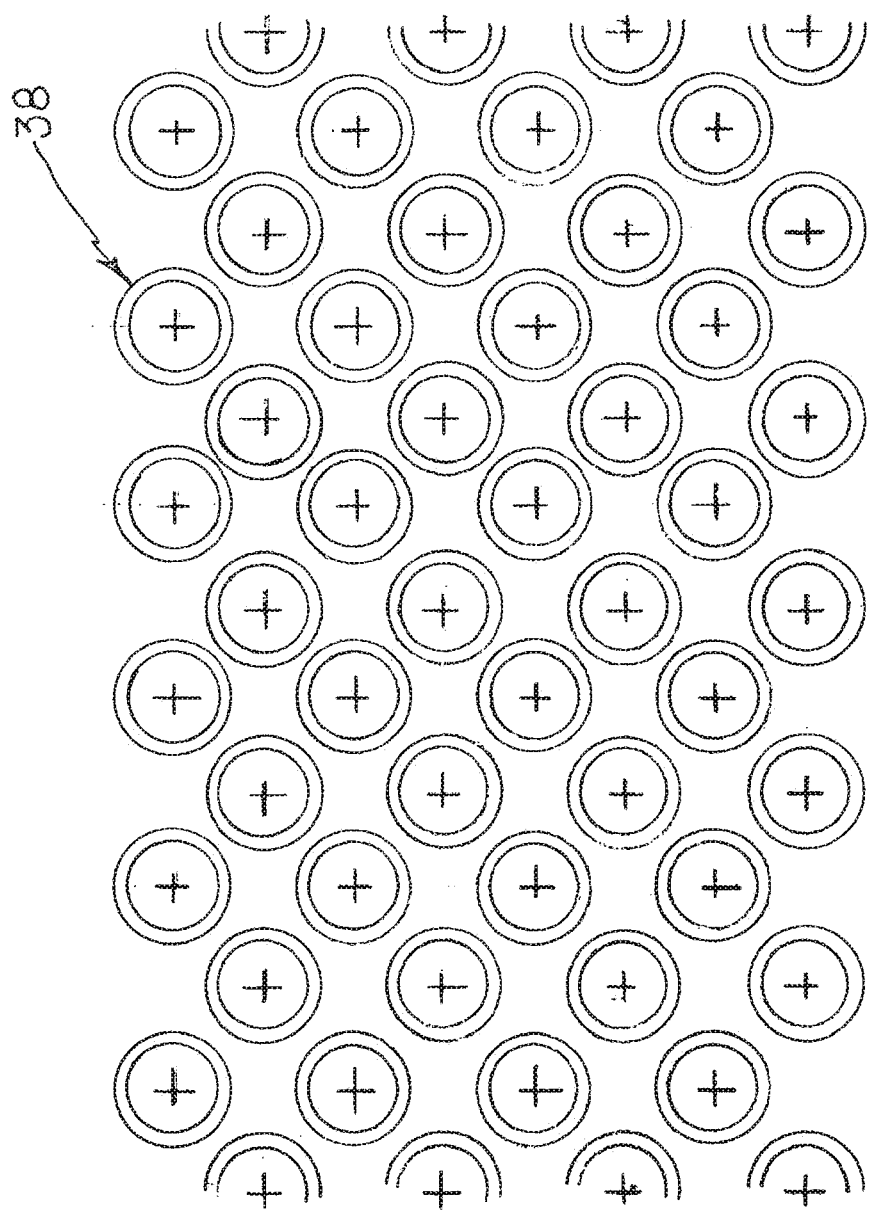
FIG. 13 shows a close up top view of holes in a furnace bushing plate.

FIG. 13 is a close-up top view of orifice tips (38) in furnace bushing plate.

Figure 14:
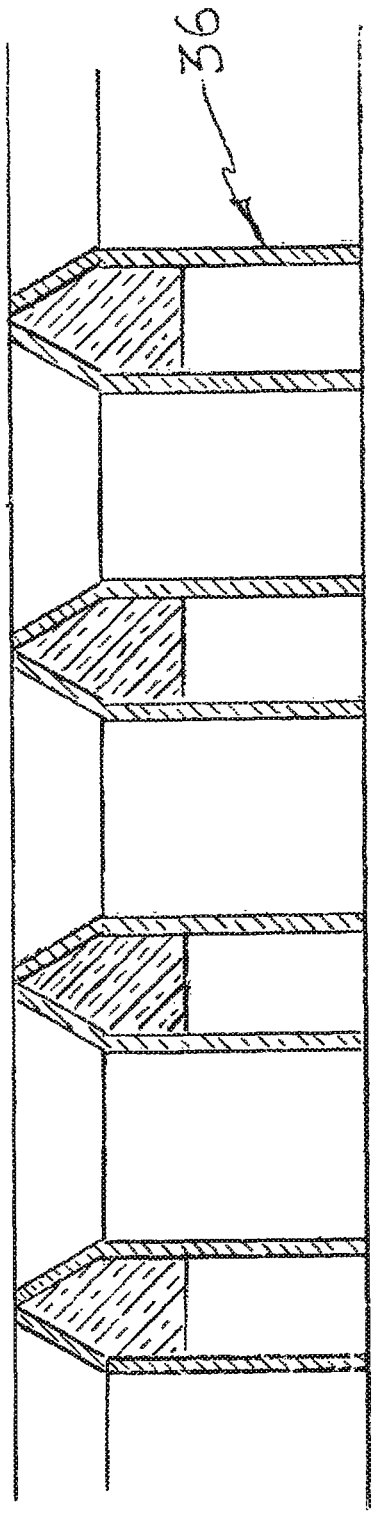
FIG. 14 shows a close up side cutaway view of holes in a furnace bushing plate.

FIG. 14 is a close-up side cutaway view of orifices (36) in furnace bushing plate.

Figure 15:
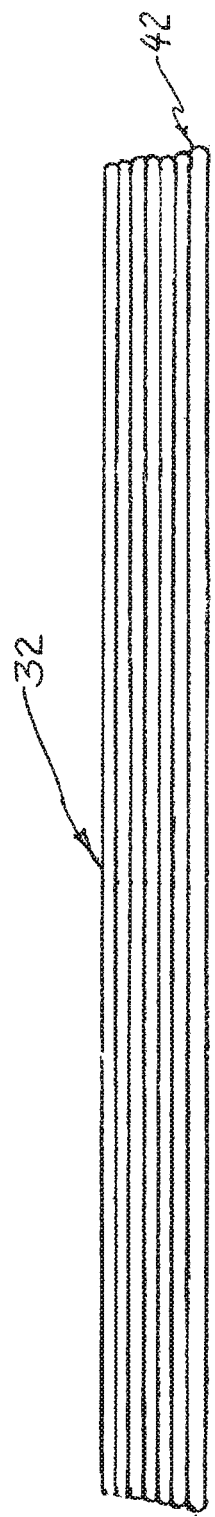
FIG. 15 shows a side view of an uninstalled cooling loop.

FIG. 15 is a side view of cooling coils (32) that are composed of a single copper air coil (42) that is ⅜ inch diameter for air entry combined with a series of ¼ inch copper tubing cooling water coils wrapped adjacent to and looped back one on the other as portrayed in the side view.

Figure 16:
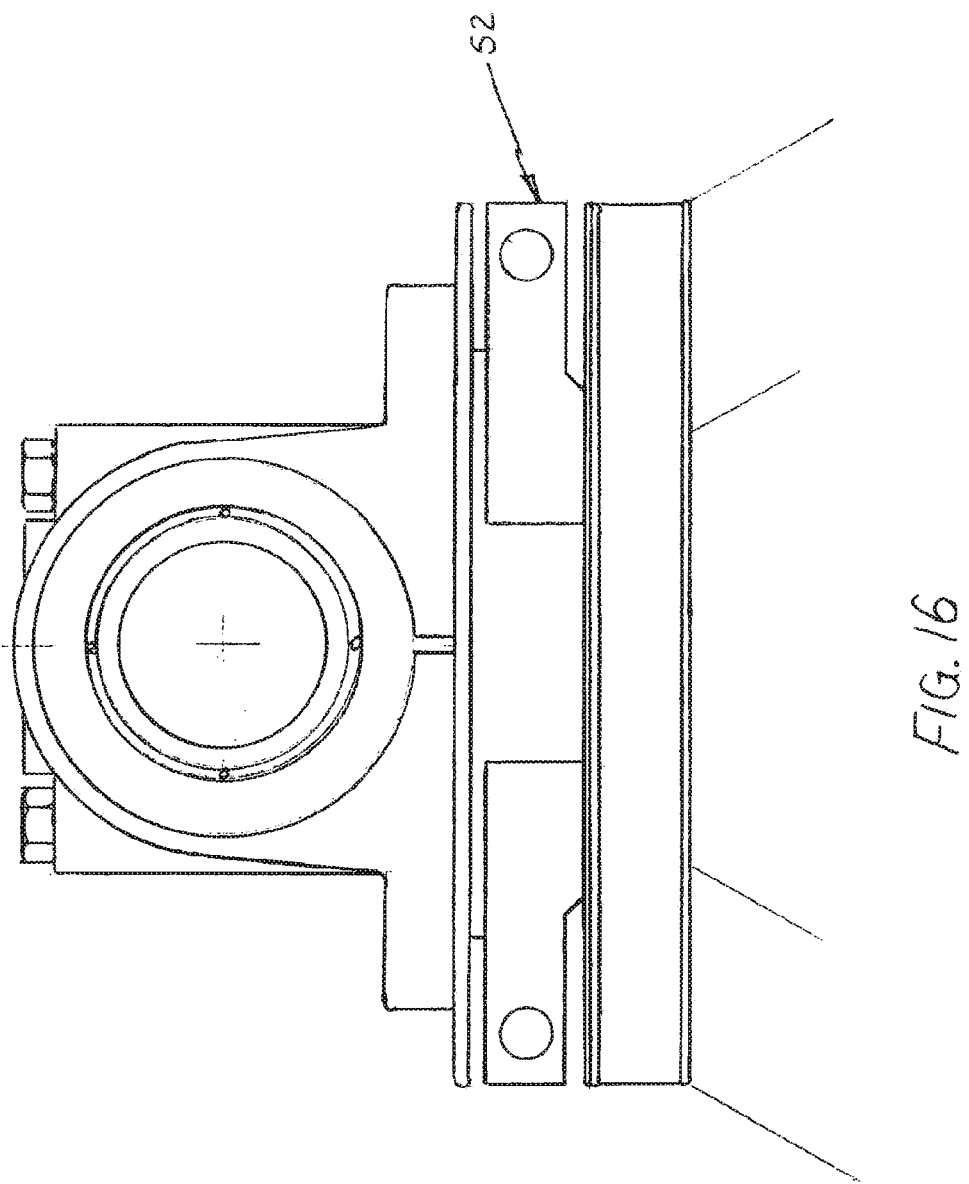
FIG. 16 shows a side view of a load cell and a bearing of a rotating drum.

FIG. 16 is a side view of strain gauge load cell (52) and bearing of rotating drum. The measurement of load cell is based on a readout from the load cell that is based on the weight of the filaments plus the weight of the resin minus the weight of the drum to achieve an accurate reflection of the weight based on the travel of the load cell caused by the applied filaments creating the mat resulting in both a weight measurement and an approximate density determination.

Raw material inputs are comprised of recycled glass cullet, urea formaldehyde (UF) resin or styrene resin and water. The recycled glass cullet is sorted for purity and clarity or turbidity which is screened to achieve maximum dimensions of ½ inch to 1¼ inches in size. The glass cullet is dropped from a glass hopper (10) on to a stationary glass feeder (12) that is then vibrated using a vibrator (14) to remove any fines or excess glass dust. The vibrated glass cullet is then dropped from the glass feeder (12) to a secondary chute (16) that feeds the furnace (18).

Additionally, urea formaldehyde resin as used in filter applications is mixed with a specific additive under shear mixer conditions. The urea formaldehyde (UF) resin is maintained at controlled temperatures around 72 degrees Fahrenheit by cooling and heating coils in the storage and dispensing tanks. The UF resin is agitated in both the storage and dispensing tanks with PH monitored continually and solids content monitored for solids rise above specified acceptable limits. Additionally the binder temperature is controlled with a reservoir as a depository for temperature controlled binder and attached to the furnace are spraying arms one with the ability to spray binder, binder species, and aqueous solutions on the fiberglass, with a secondary spraying assembly capable of spraying aqueous solutions on a rotating drum and on roller assemblies. The secondary arm sprays aqueous solutions in a specified width at least (4 inches) but no greater than the width of the swath of fiberglass exiting the bushing plate.

In some instances styrene resin for composite applications is mixed with other additives such as polybutene by a shear mixer and temperature controlled with heating and cooling coils in the storage tank. PH is monitored and the tank is continually agitated to ensure complete mixing of the styrene without heat or cool spots occurring in both the storage and dispensing tanks. Styrene percent solids are continually monitored.

Water is conditioned soft and in some cases the water is mixed with the resin creating an aqueous solution or the water which may be sprayed onto resin as it is applied to a rotating drum to control the moisture level of the resulting fiberglass mat formed. Additionally, the water is utilized as a spray, fog or rolled onto the expanded fiberglass mat before it enters a curing process.

Glass Melting Furnace (18)

The glass melting process involves the use of natural gas and combustion air mixtures controlled by a feedback loop from a flame temperature sensor (20). The air/fuel mixture can be controlled manually to the burner assembly, if necessary and for system start-up and shut-off. The molten glass level is controlled to maintain a minimum level in the furnace (18) based on a set point controller (26). Once the glass level minimum is reached more glass is automatically fed to the furnace by the glass hopper (10) to a vibrator (14) mounted under the stationary glass feeder (12) all of which is controlled by a feedback loop from the set point controller (26). The furnace (18) is mounted on a traverse cart (22) with track (24).

Bushing Plate (28), Orifices (36), Orifice Tip (38) and Cooling Coils (32)

Molten glass exits the furnace (18) through an Inconel® bushing plate (28) in one of various bushing plate configurations, in continuous strand filaments of approximately 25 to 35 microns in diameter, depending on the final product specifications desired, one or the other bushing plate configuration is used as specified in various custom client configurations. Cooling is accomplished through cooling coils (32) and controller with cooling coils of a 3 inch width and 15 inches long mounted directly under the Inconel bushing plate (28) in a race track pattern. Additionally design changes are accomplished through varying bushing plate (28) designs and further orienting the bushing plate (28) so that the bushing plate (28) is at a near perpendicular angle to the length of the drum at a minimum 6 degrees relative (30), along the longitudinal axis of the drum. Shields (34) are mounted under the bushing plate (28) at either side to prevent room air flow from disrupting the fall of continuous strands through the Inconel bushing plate (18) to the drum below.

Bushing plate (28) orifices (36) have an orifice size measured in a drill size and machine bit referred to as a 27 drill which is the finest. The tip (38) with the largest size of an orifice is the 10 drill, in this aspect, the orifice tip (38) sizes have alternating hole sizes which are at least a 7 row plate, with another control at the 8-9 row plate orifice patterns (40) of orifices (36), width of the row of orifice tip (38) holes as being in the range of 7-10 row, with the 7 row plate being 298 holes and the largest being a 10 row plate which is 425 tip hole. Patterns are such as to leave a space (86) of 0.500" between two sections of bushing plate (28) orifice tips (38) creating orifice tip patterns (40). The filaments exiting from the orifices of the bushing plate (28) wrap onto the rotating drum at a 6 degree relative angle (30) to the longitudinally and circumferentially enlarged drum providing for more efficient operation and control. The bushing plate (28) forces the exiting molten fiberglass filament onto the drum at a relative angle of 6 degrees (30) plus or minus 1 degree from perpendicular to the axis of the drum altering the relative position of the exiting filament to the rotating drum and the orientation of the orifices based on the configuration and orientation of the bushing plate (28) relative to the drum.

Immediately below the bushing plate (28) and attached to the furnace (18) are cooling coils (32) and copper air coil (42) that together with pressure controls for monitoring clogging and temperature and water pressure control make up the bushing cooling loop assembly that cools the continuous filament strands to a temperature that is cool to the touch, slightly above ambient temperature. The cooling water is supplied either by chiller or from constant temperature water well. Pressure sensors detect if the cooling water loop is becoming clogged by particulates. Temperature sensors provide feedback to the chiller to control temperatures of the bushing cooling loop assembly. The bushing cooling loop assembly consists of 7 quarter inch copper tubes wrapped around the bottom of the furnace (18) against the bushing plate (28). These cooling coils (32) are looped in a racetrack (rectangular) pattern within 1 inch of the bushing plate (28). The bushing cooling loop assembly executes a loop that is 15 inches long and 3 inches wide at its inside diameter. One coil is an air coil that is ⅜ inch copper tubing with an air/water in and water exiting the bushing cooling loop assembly at an 80 degree angle. The shields (34) previously mentioned are placed around the area just below the bushing plate (28) and attached to the furnace (18) to control the ambient air movement and air movement generated by the rotating drum or by the traverse of the furnace on the traverse cart (22). The shields (34) prevent excessive air movement from causing the glass continuous strand filaments to collide. The bushing cooling loop assembly cools the fibers as they exit orifice tips (38) of the orifices of the bushing plate (28). Cooling is accomplished by pumping water through the loops such that the running water cools the filaments in a specified timeframe bringing those filaments to room temperature.

Rotating Drums and Traversing Melt Furnace

The rotating drums are wrapped in plastic sheeting to enable the mat's removal from the drum. Once the plastic sheeting wraps the drum, a thin application of mold release oil is applied to the surface of the sheeting. As the filament strands fall from the bushing plate (28) an operator assists the process in attaching the falling filament strands of molten glass to the plastic sheeting wrapped drum. Additionally, the operator may assist in reattaching filaments that have detached from the rotating drum and reattach as necessary. The rotating drum is circumferentially and longitudinally superior in size with a substantial and sustainable control of the rotation of the drum to control the speed of layering of fiberglass upon the rotating drum.

The furnace traverse (44) of the drum's length repeatedly following a specified longitudinal continuous path covering the drum with a layer of fiberglass along the traverse track (46) with the traverse cart (22). In one embodiment, as the glass is applied to the drum, a resin mixture sprayed from a resin arm attached to the traverse and water sprayed from a water arm attached to the traverse are sprayed onto the fiberglass on the drum by resin spray nozzle (48) and water spray nozzle (50) situated and aimed at the back of the drum. The spray nozzles are linked to the movement of the furnace traverse and the spray nozzles traverse the back of the drum in synchronicity with the traverse of the furnace (44) across the drum at least 4 inches in width but in no case wider than the width of the falling fiberglass filaments in one embodiment no more than 4 inches in width. Physical elements of the process are controlled by a computer machine and software program controlling the number and speed of furnace movement or furnace traverse (44), rotation speed of the drum, and application of resin spray mixture from resin spray nozzle (48) and/or water spray mixture from water spray nozzle (50). The computer's control of these parameters through a software program and control of these variables and operating parameters permits the mat to have progressive densities when expanded. As the filaments are spun onto the rotating drum and the melt furnace or furnace traversing (44) following the traverse track (46) and its relative position in relation to the drum below then the drum can be sprayed with an aqueous solution from a first arm attached to the traverse of the furnace as the furnace traverses the drum or a first arm or a second arm, mounted on the traverse that sprays binder (or binder species composed essentially of binder, chemical additives, and water or aqueous solutions) onto the back side of the rotating drum as the furnace traverse the drum following the traverse track (46). Temperature control system of the binder in the reservoir is accomplished to within + or −10% of 70 degrees Fahrenheit. The temperature controlled binder or combination binder species may be sprayed onto the rotating drum in tandem with an aqueous solution.

The mat article is complete when a total weight measurement of glass fiber, resin mixture and water has reached the weight prescribed in the formulation of each specific product. Attainment of the product specific weight can be controlled in some cases by load cells (52) or by calculating the time necessary for that product specific weight to be attained. The formula of the load cell weight control is achieved by taking the weight of the fibers on the drum adding the weight of the resin and subtracting the weight of the drum. When the mat reaches its product specific weight, the spinning of the drum is complete and the operator actuates the braking mechanism on the drum drive. The drum has a V-shaped slot (54) that runs longitudinally parallel to the axis of rotation of the drum from one end to other across the width of the drum and thereby across the width of the continuous strand filament mat laying thereupon. The operator uses this slot to cut the mat from the drum. At this point the mat is promptly removed from the drum, laid on a flat surface covered with plastic sheeting; from there the mat is rolled onto a steel bar in a direction perpendicular to the axis of rotation of the drum. The weight of the mat is confirmed and recorded by weighing the rolled mat and calculating the net rolled mat weight.

Let-Off Table: Entry and Exit

The rolled mat is transported to the Let-Off Table which is a slow moving conveyor slightly larger than the unrolled mat. The mat is unrolled onto the moving conveyor and the top layer of plastic is removed. The unrolling process requires that the mat be unrolled with no creases or folds, straight with its edges equidistant from the sides of the conveyor; otherwise the unrolled mat will not expand properly. The resin coating the glass strands is heated from above and below to soften the resin. As the leading edge of the unrolled mat emerges beyond the exit edge of the conveyor, the leading edge of the mat is guided through water spray rollers and onto a bottom conveyor chain of the curing oven using a guide rope attached to the leading edge. The curing oven's bottom conveyor chain pulls the mat into the oven. As each mat exits the Let-Off table it is attached with ropes to the end of the mat ahead of it so successive mats are continuously drawn into the curing oven. The ropes are used to connect mats because ropes do not damage the slitter knives used later in the process.

Media Upper and Lower Skin Control Assembly with Water Spray for Bowed and Straight Rollers The water sprayers (56) spray water onto the top rollers (58) and bottom rollers (60) of skin control assembly, thereby controlling operating parameters creating various densities of the top and bottom surface skinning or skins and to a certain extent the stiffness of the final finished fiberglass product. As the mat is drawn into the oven, it first passes through the top rollers (58) and bottom rollers (60) which have a series of metal rollers with water sprays (56) associated with them. For some products straight rollers (66) are used with upper (74) and lower (76) separately controlled drive assemblies and for other products curved or bowed (68) rollers are used. For some products water spray is fogged directly onto the expanded mat by water fog assembly (70) as it passes over or under the rollers. For other products water spray is fogged onto the top or the bottom of the rollers so that water is indirectly applied to the top or the bottom of the mat through first being applied to the top or the bottom of the rollers. The water sprayers (56) are part of the Media Upper and Lower Skin Control Assembly and are mounted on rolling casters so various combinations and embodiments of the water sprayers (56) of the Media Upper and Lower Skin Control Assembly (65) can be inserted into the process as needed. Additionally, each media upper and lower skin control assembly (65) may have a separate integrated catch basin (72) attached to capture excess water from the spraying process.

Curing Oven (88) and Oven Conveyor Assembly (80 and 82), Multi-zoned Interior (84) and Controller The operating parameters of the oven determine the weight per square foot, the loft, the compressive strength and to some extent the stiffness of the final product and are controlled by a curing oven controller with computer and software. The speed of upper rollers of conveyor chain (82) is regulated according to a precise formula at a speed slightly different than the speed of oven's lower (80) rollers of the conveyor chain which controls the speed of the expanded mat as it travels through the interior (84) of the oven on the conveyor chain. The interior (84) of the oven is multi-temperature zoned. The shut-off switch in the controller for the rollers (80, 82) is electrically linked and integrated with the oven's conveyors so that both start-up and shut-down simultaneously at the controller.

As the mat is drawn into interior (84) of the oven, operators expand the mat to the proper width for the product being made. The upper rollers of the conveyor chain (82) of the curing oven are set to a specific height for each product to set the loft (i.e. the height) of the expanded fiberglass.

The temperatures of the multiple heating zones in the curing oven interior (84) are set by oven operation to an appropriate temperature for the product being cured at the controller.

Accumulator and Windup Machine

As the cured mat exits the oven, it is drawn into a set of accumulator rollers, initially by the rope threaded through the accumulator assembly by operator assist and onto the windup section where it is wound onto a cardboard core. Immediately after exiting the oven, the expanded mat passes over a roller where it is cut by circular roller knives, cutting off the uneven outside edges and slitting the mat into rolls of the prescribed product dependent widths. After the rolls reach the appropriate length on the windup cores, the operator stops the rolling process and then the operator intervenes to cut the wound mat from the larger roll. The accumulator section allows the rest of the mat to continue traveling through the oven while the rolls of finished product are removed from the windup section and new cores are put in place. The leading edge of the next section of the mat is then attached to new windup cores and the operator actuates the accumulator to resume feeding the slit rolls onto the cardboard cores.

Quality Control Equipment

Quality of finished product is maintained through an extensive process of inline and post quality control process steps including measuring loft and roll width utilizing a quality control fixture which measures loft and roll width, through another fixture that cuts out single square foot samples, while another fixture is used to measure the compressive strength of a square foot sample. Each square foot sample is weighed. Additionally the top and the bottom skin of a sample are removed and the scale is used to determine the percentage by weight of the skin on the top surface the percentage by weight of the skin on the bottom surface.

Generally, in another aspect, a method of forming a fiberglass mat, having the steps of feeding a fiberglass media or mat between bowed (68) or straight (66) rollers of the roller assembly apparatus driven by drive assemblies (74) for both upper and lower rollers that are separately driven providing for a differential pressure across the mat reducing weight variation across the web as it is fed into the curing oven but allowing for control of the density in a progressive manner, which is referenced in this aspect as expanding the mat. Bowed rollers are to optimize the stretch of the fiber mat to apply water to the mat. Weight variation is improved from +/−20% to +/−5% across the finished expanding mat, with consistent water content and an improved top and bottom skinning or surface formation.

In some embodiments the relative pattern of the glass fibers fed onto the rotating drum is adjusted by the orientation of the bushing plate (28) and the orifices (36) thereby.

In another embodiment load cells (52) are utilized to decrease weight variations of the fiberglass media as mat. Load cells (52) increase accuracy of the final weight over that of other techniques improving product quality weight accuracy from +/−20%, to +/−5%.

In another embodiment applying water by water spray nozzles (50) onto a flat mat surface applies the water more consistently resulting in higher quality skins.

In other embodiments, water is applied to the binder as it is applied to the fiberglass and/or is applied to the fiberglass mat as the binder is applied to the fiberglass mat controlling the moisture to a targeted moisture level plus or minus 2.5%.

In another embodiment binder species temperature range is controlled to 70 degrees Fahrenheit + or −10%.

All systems are controlled and configured with a software program integrally operating upon a computer machine.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention. For instance there are embodiments that include only straight rollers for expansion of the fiber mat, and some where water fog nozzle sprays water on the rollers, and in other cases a water spray head wets the rotating drum prior to wrap the fiberglass on the rotating drum.

What is claimed is:

1. An apparatus for use in fiberglass manufacturing, comprising:
   a traversing melting furnace configured to maintain a minimum level of glass during operation;
   a rotatable drum positioned below the melting furnace;
   one or more spray nozzles positioned proximate to the rotatable drum;
   a let-off table assembly comprising a table, a first heat source configured to apply heat from directly below the table, and a second heat source configured to apply heat from directly above the table;
   a curing oven proximate to the let-off table assembly, the curing oven comprising a first chamber and a second chamber;
   an upper chain conveyor disposed within the first chamber;
   a lower chain conveyor disposed below the first chamber and the second chamber.

2. The apparatus of claim 1, wherein:
   the first chamber comprises a first heated zone; and
   the second chamber comprises a second heated zone.

3. The apparatus of claim 2, wherein:
   the upper chain conveyor moves at a first speed; and
   the lower chain conveyor moves at a second speed which is different from the first speed.

4. The apparatus of claim 2, further comprising one or more sprayers operatively connected to the curing oven and proximate to the first chamber.

5. The apparatus of claim 1, further comprising:
   one or more temperature sensors;
   one or more air flow sensors; and
   a computer communicatively coupled to the one or more temperature sensors, the one or more air flow sensors, the upper chain conveyor, and the lower chain conveyor.

6. The apparatus of claim 1, wherein a flame within the traversing melting furnace is controlled by a feedback loop from a flame temperature sensor.

7. The apparatus of claim 1, wherein:
   the traversing melting furnace comprises a bushing plate; and
   the bushing plate comprises a plurality of orifices disposed in a substantially rectangular pattern.

8. The apparatus of claim 7, wherein the plurality of orifices is centered above a horizontal edge of the rotatable drum.

9. The apparatus of claim 7, further comprising one or more shields extending below the bushing plate.

10. The apparatus of claim 7, wherein:
    the traversing melting furnace is configured to move in a first direction parallel to an axis of the rotatable drum; and
    the bushing plate is oriented at a 6-degree angle relative to the first direction.

11. The apparatus of claim 10, wherein the one or more spray nozzles comprises:
    a water spray nozzle configured to spray water onto a swath of fiberglass on the rotatable drum; and
    a resin spray nozzle configured to spray resin onto the swath of fiberglass.

12. The apparatus of claim 11, wherein the resin spray nozzle is configured to spray resin in a width of between 4 inches and a width of the swath.

13. The apparatus of claim 11, comprising:
    a storage tank containing resin;
    a dispensing tank fluidly coupled to the storage tank and the resin spray nozzle; and
    a temperature control assembly configured to control a temperature of the dispensing tank.

14. The apparatus of claim 1, wherein:
    the bushing plate comprises 298 to 425 orifices arranged in 7 to 10 rows.

15. The apparatus of claim 1, further comprising a bushing cooling loop assembly positioned below the melting furnace.

16. The apparatus of claim 15, wherein the bushing cooling loop assembly comprises:
    a plurality of coils comprised of tubing containing water; and
    a coil comprised of perforated tubing containing air.

17. The apparatus of claim 1, wherein the one or more spray nozzles are rigidly coupled to the traversing melting furnace.

18. The apparatus of claim 1, comprising:
    a load cell coupled to the rotatable drum; and
    a control computer configured to control a speed of the traversing melting furnace and a rotational speed of the rotatable drum.

19. The apparatus of claim 1, further comprising a roller assembly operatively coupled to the rotatable drum, wherein the roller assembly comprises one or more rollers.

20. The apparatus of claim 1, wherein the roller assembly comprises a plurality of bowed rollers.

21. The apparatus of claim 1, further comprising a pumping assembly comprising:
    one or more top rollers;
    one or more bottom rollers;
    a first pump;
    one or more bottom spray heads fluidly coupled to the first pump;
    a second pump; and
    one or more top spray heads fluidly coupled to the second pump.

22. The apparatus of claim 1, wherein the traversing melting furnace is configured to receive recycled glass cullet.

23. The apparatus of claim 1, further comprising:
a glass hopper;
a stationary glass feeder mounted below the glass hopper;
a vibrator coupled to the stationary glass feeder;
a chute coupled to the traversing melting furnace; and
wherein the glass hopper and the stationary glass feeder are configured to provide glass to the chute.

24. The apparatus of claim 1, wherein
the first heat source comprises a gas burner; and
the second heat source comprises a radiant heater.

25. An apparatus for use in fiberglass manufacturing, comprising:
a traversing melting furnace comprising a bushing plate;
wherein the bushing plate comprises a plurality of countersunk orifices;
a rotatable drum positioned below the bushing plate;
one or more spray nozzles coupled to the traversing melting furnace and positioned proximate to the rotatable drum;
a let-off table assembly comprising a table, a first heat source configured to apply heat from directly below the table, and a second heat source configured to apply heat from directly above the table; and
a curing oven proximate to the let-off table assembly, the curing oven comprising a first chamber and a second chamber.

* * * * *